United States Patent [19]
Casada

[11] Patent Number: 5,483,841
[45] Date of Patent: Jan. 16, 1996

[54] METHOD AND APPARATUS FOR MONITORING MOTOR OPERATED VALVE MOTOR OUTPUT TORQUE AND POWER AT VALVE SEATING

[75] Inventor: Donald A. Casada, Oak Ridge, Tenn.

[73] Assignee: Martin Marietta Energy Systems, Inc., Oak Ridge, Tenn.

[21] Appl. No.: 274,738

[22] Filed: Jul. 18, 1994

[51] Int. Cl.[6] .................... G01M 19/00; G01P 13/00
[52] U.S. Cl. .................... 73/862.193; 73/862.17; 73/865.9
[58] Field of Search .............. 73/862.17, 862.23, 73/862.28, 862.193, 865.9, 112, 116

[56] References Cited

U.S. PATENT DOCUMENTS

| | | | |
|---|---|---|---|
| 3,019,640 | 2/1962 | Engelmann | 73/862.193 |
| 3,130,581 | 4/1964 | Schulman | 73/862.193 |
| 3,137,163 | 6/1964 | Engelmann | 73/862.193 |
| 4,542,649 | 9/1985 | Charbonneau et al. | 73/862.193 |
| 4,616,179 | 10/1986 | Braun | 324/158 MG |
| 4,660,416 | 4/1987 | Charbonneau et al. | 73/862.193 |
| 4,672,288 | 6/1987 | Abbondanti | 318/803 |
| 4,690,003 | 9/1987 | McNennamy et al. | 73/862.193 |
| 4,735,101 | 4/1988 | Charbonneau et al. | 73/862.193 |
| 4,860,596 | 8/1989 | Charbonneau et al. | 73/862.193 |
| 4,888,996 | 12/1989 | Rak et al. | 73/862.193 |
| 4,965,513 | 10/1990 | Haynes et al. | 324/158 MG |
| 5,153,506 | 10/1992 | Trenkler et al. | 324/545 |

FOREIGN PATENT DOCUMENTS

| | | | |
|---|---|---|---|
| 3927476A | 2/1991 | Germany | 73/862.193 |
| 212730A | 12/1984 | Japan | 73/862.193 |
| 922663 | 8/1980 | U.S.S.R. | |
| 2044940A | 10/1980 | United Kingdom . | |

OTHER PUBLICATIONS

Gielissen et al, "A Method for Measuring Torque Oscillations in Rotating Electrical Machines", International Conference on Electrical Machines, Athens, Greece 15–17 Sep. 1980.

Application Data–AC *MG 1–14.35 Effects of Unbalanced Voltages on the Performance of Polyphase Induction Motors.*

*Electromechanical Devices for Energy Conversion and Control Systems.*

Primary Examiner—Richard Chilcot
Assistant Examiner—George M. Dombroske
Attorney, Agent, or Firm—E. A. Pennington; J. M. Spicer; H. W. Adams

[57] ABSTRACT

A method and apparatus are provided for monitoring a motor operated valve during the brief period when the valve seats and the torque switch trips to deenergize the valve motor. The method uses voltage measurements on the load side of a deenergizing switch that opens to deenergize the motor to determine, among other things, final motor rotational speed and the decelerating torque at motor deenergization.

7 Claims, 9 Drawing Sheets

METHOD AND APPARATUS FOR MONITORING MOTOR OPERATED VALVE MOTOR OUTPUT TORQUE AND POWER AT VALVE SEATING

This invention was made with Government support under contract DE-AC05-840R21400 awarded by the U.S. Department of Energy to Martin Marietta Energy Systems, Inc. and the Government has certain rights in this invention.

FIELD OF THE INVENTION

The present invention relates generally to diagnostic and monitoring systems for machinery operated by electric motors and, more specifically, to a method and apparatus for monitoring a motor operated valve (MOV) during the brief period when the valve seats and the torque switch trips to deenergize the valve. Voltage measurements are taken downstream of the contacts that open to deenergize the motor in order to provide final motor rotational speed and decelerating torque at motor deenergization.

BACKGROUND OF THE INVENTION

Motor operated valves (MOVs) are used in many critical applications to control and/or isolate fluid flow. All nuclear power plants, as well as fossil, petrochemical, and other industries that handle fluids routinely apply MOVs to accomplish positive isolation of flow.

It is, of course, highly desirable to diagnose and monitor the operating condition of various electric motors, including MOVs, particularly those used in critical applications. An example of a monitoring system is described in U.S. Pat. No. 4,542,649 to Charbonneau et al. The monitoring system includes motor current measurement, and means for correlating spring pack movement to valve stem load.

Another example of a monitoring system is described in U.S. Pat. No. 4,965,513 to Haynes et al. In this system, motor current is sensed, conditioned, and analyzed in the frequency domain to diagnose operability of the motor.

Existing techniques are available for measuring torque of an ac motor while the motor is coupled to a line voltage. An example is described in U.S. Pat. No. 4,616,179 to Braun. The system described therein measures line to neutral voltage and line current and derives torque therefrom.

With respect to MOVs, a particularly important parameter associated with flow isolation is the force applied to seat the valve. The MOV's close direction stroke is terminated when a torque switch opens to deenergize the motor. The sensor used to measure torque does not measure motor torque directly; rather, it is actuated through the movement of a worm which is located several mechanical interfaces from the motor shaft. As a result, the actual motor torque is not known.

Most MOV motors are electric ac induction motors. Motor output torque can be affected by a variety of factors, such as manufacturing uncertainties, rotor condition, stator condition, line voltage, and motor temperature. MOV motors have been particularly subject to rotor degradation, due in part to the use of magnesium rotors (to minimize the rotational inertia of the motors).

The motor torque output at reduced voltage is of critical concern because of the requirement that the motor must open or close the valve in a degraded voltage condition. Unless test data is available on a specific motor, conservatism for manufacturing uncertainties and motor feeder parameters must be applied to the torque output calculation. These conservatisms can make successful motor torque calculations extremely difficult.

During the majority of the MOV stroke, the motor is only very lightly loaded. As a result, its speed is normally very near synchronous. However, during the increased load experienced by the motor during valve seating, the motor slows down slightly and its output torque increases significantly. At the moment that the torque switch trips the motor, the torque output developed by the motor is at its maximum.

If motor speed were known, it would be possible to roughly estimate the motor torque (using generic manufacturer data). However, the motor shaft is totally enclosed within the operator, and therefore, motor speed cannot be measured from external means, such as shaft gear proximity probes. Likewise, torque cannot be directly measured using conventional means, since shaft torque measuring devices require the insertion of a torque cell integral with the motor shaft.

There have been technologies developed which measure speed (based on motor current) during the steady-state portion of the stroke, but there are no existing technologies which allow the measurement of the final speed or torque at motor deenergization, which is the most important condition to understand.

SUMMARY OF THE INVENTION

An object of the present invention is to provide an apparatus and method for determining motor rotational speed, torque, and power at motor deenergization.

Another object of the present invention is to provide a relatively simple, non-intrusive method and apparatus for determining key motor parameters which, when used in conjunction with other measurements, give a clear understanding of motor and other drive train component efficiencies.

These and other objects of the invention are met by providing an apparatus for monitoring an electric motor coupled to a power supply line and having a deenergizing switch disposed in the power supply line, which includes means, coupled to a load side of the deenergizing switch, for sensing at least one electrical parameter associated with the motor, and means for correlating the at least one electrical parameter to at least one operating parameter of the motor.

Other objects, advantages and salient features of the invention will become apparent from the following detailed description, which taken in conjunction with the annexed drawings, discloses preferred embodiments of the invention.

DETAILED DESCRIPTION OF THE INVENTION

Figure 1:
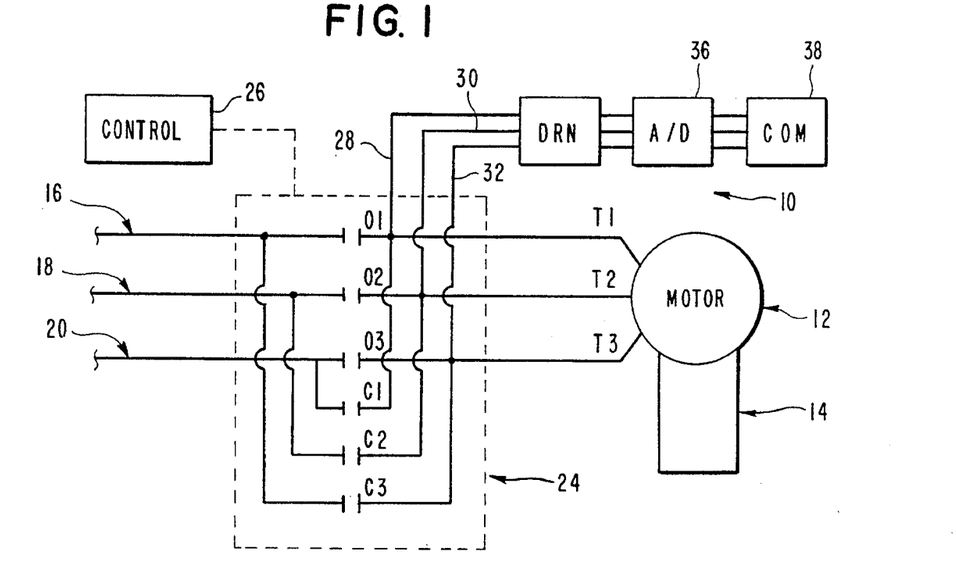
FIG. 1 is a schematic view of a first preferred embodiment of the present invention.

Referring to FIG. 1, an apparatus 10 for determining at least one operating parameter of an electric motor 12 is shown schematically. The motor 12 is operatively coupled to a mechanical device 14. In a particular application of the invention, the motor 12 is a polyphase ac motor coupled to an operator of a motor operated valve 14.

Both the motor operated valve 14 and the ac motor 12 are standard equipment currently in use in many different industrial applications, including fluid control in power generating plants. An example of the motor 12 is a three phase, 4 HP, 230/460 volts, 14/7 amps ac induction motor having a moment of inertia (WR$^2$) of 0.33 lb.ft.$^2$ and manufactured by Reliance Electric Company of Cleveland, Ohio.

The motor 12 is energized by a three phase power supply delivered to the motor 12 through three separate lines 16, 18, and 20 and 22 coupled to the motor 12 at terminals T1, T2, and T3, respectively. A contactor array 24 is disposed in the lines 16, 18 and 20 to deenergize the motor 12 when the valve element has attained its open and closed positions. Operation and control of the contactor array 24 is well known and will be described briefly as follows.

The array 24 consists of two sets of switches, o1, o2, o3, and c1, c2, and c3. When the "o" set is closed, the "c" set is open, and visa versa. Thus, when o1, o2, and o3 are closed, the motor 12 is energized by having lines 16 18, and 20 coupled to terminals T1, T2, and T3. This will cause the output shaft of the motor 12 to rotate in an "opening" direction.

When c1, c2, and c3 are closed, the motor is energized by having line 16 coupled to T3, line 20 coupled to T1 and line 18 coupled to T2. This coupling of phases causes the motor 12 to operate in the opposite, closing direction.

Control of the contactor array 24 is through a control device generally referred to by the numeral 26. This device 26 would typically include a three button (open, stop, close) pushbutton setup, with two lights to indicate full open or close positions of the valve. When the valve is at some intermediate position of travel, both lights will be on.

The control device also typically includes two limit switches, one corresponding to each of the fully open and fully close positions. The limit switches, schematically incorporated into the control device 26, cause the contactor array 24 to deenergize the motor 12 by isolating the motor 12 from the line current. For gate, globe, piston, etc. (linearly actuated) valves, the open limit switch stops the motor going open, but the torque switch stops the motor going closed.

The present invention provides a method and apparatus for determining motor rotational speed, torque, and power at motor deenergization. This is accomplished by measuring voltage or other electrical parameters on the load side of the contactor array 24. Leads 28, 30, and 32 are connected respectively to lines 16, 18, and 20 for voltage measurement.

The motor rotational speed immediately following torque switch trip is rapidly decelerated by the torque that the motor 12 had been applying just prior to shutoff due to the fact that MOVs employ self-locking gearing. The self-locking gearing not only prevents the valve from backing out of the seat, but causes the motor shaft to see an essentially constant decelerating torque. It should be noted that for very lightly loaded conditions (with minimal practical effect in real-world conditions), the MOV motor coastdown itself can result in a slightly greater torque; for practical purposes, however, the torque is constant.

Because of the rotational inertia of the motor, the motor does continue to turn for a brief period (typically less than 0.25 seconds during valve seating). During this brief period, the motor actually turns into an ac generator. The frequency of the output of the generated signal is directly proportional to the rotational speed of the motor. When this voltage is measured, a decay curve for voltage on one of the motor phases such as that shown in FIG. 2 will be observed. Depending upon the actual shaft torque, the decay rate will vary, as shown in FIG. 3(a)–3(c) for three different torque switch settings. Note that the torque switch settings are simply numerical values assigned to the switch, and are not linearly proportional to actual torque.

Figure 2:
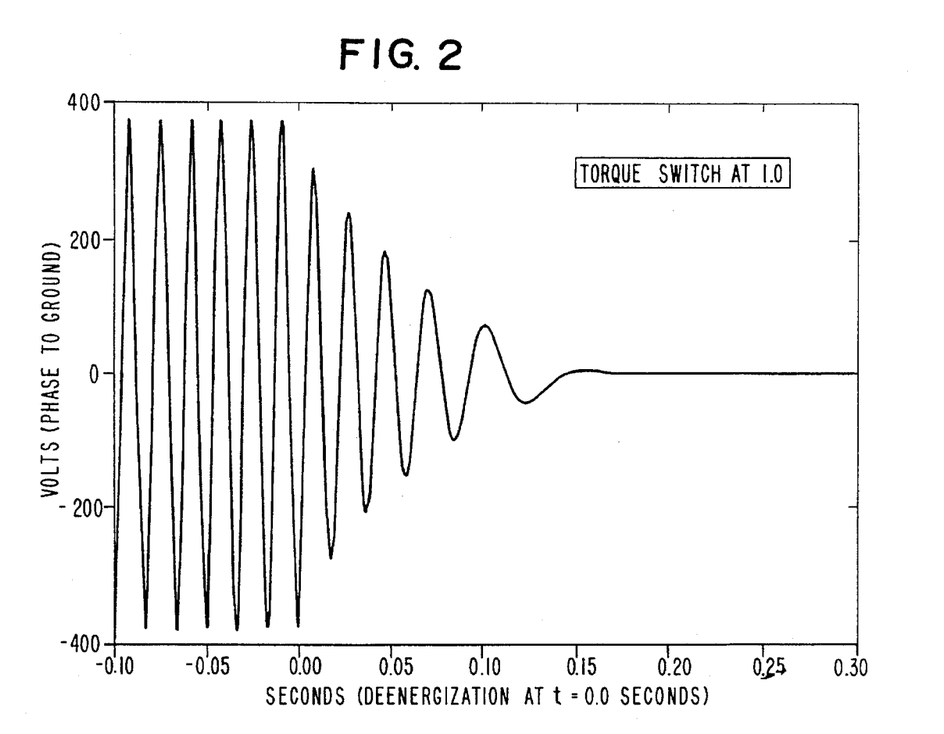
FIG. 2 is a voltage decay pattern following motor deenergization (at t=0.0) with a torque switch setting of 1.0.
Figure 3A:
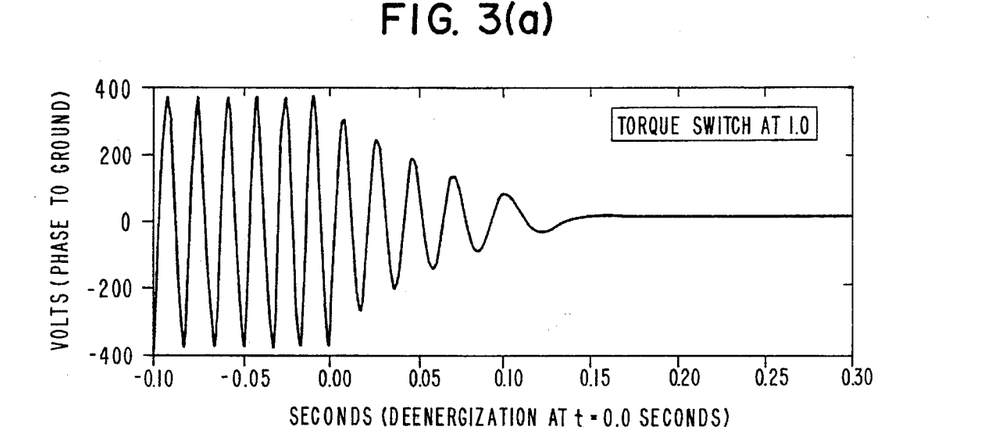
FIGS. 3(a)–3(c) are voltage decay patterns following deenergization, with torque settings at 1.0, 1.5, and 2.5, respectively.
Figure 3B:
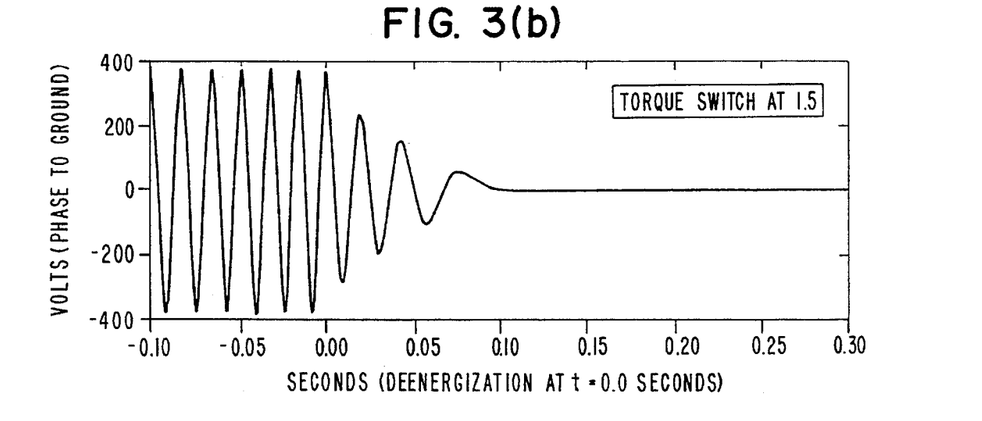
Figure 3C:
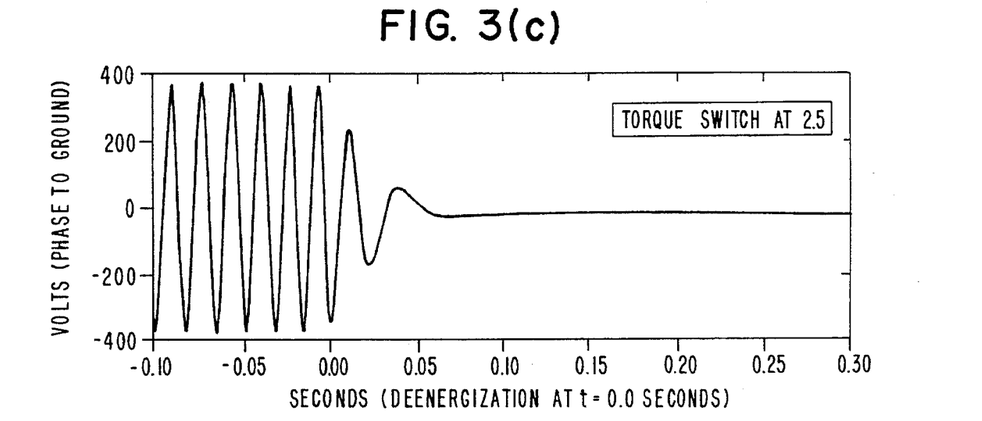
Figure 4:
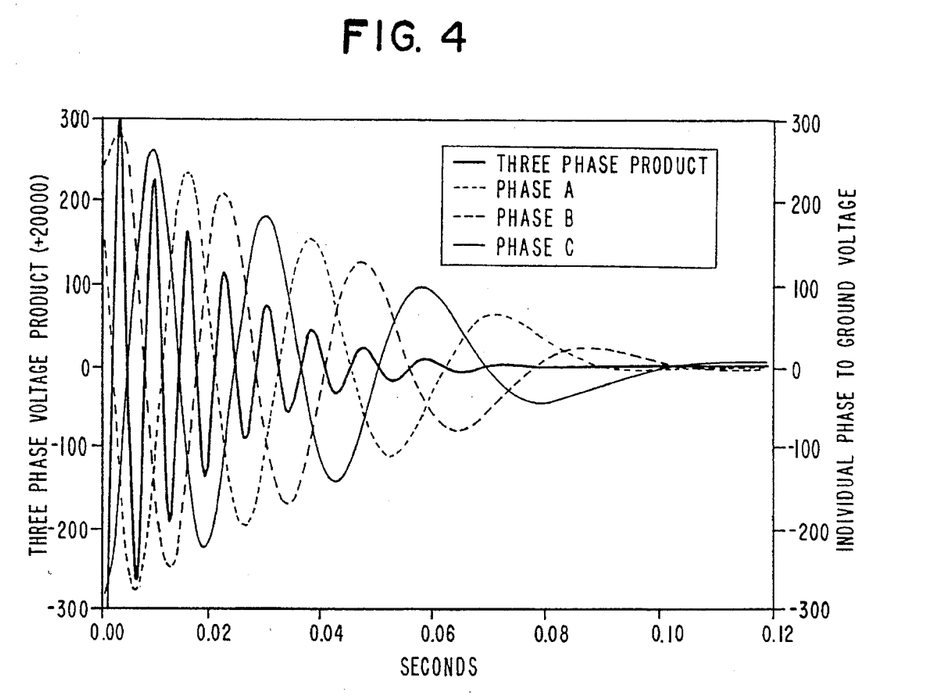
FIG. 4 is a voltage decay pattern for individual and three phase product voltage decay following deenergization for a torque switch setting of 1.5.

The voltage can be measured by looking at the voltage of individual phases to ground, as shown in FIG. 2, by using one of the three leads 28, 30, and 32, or all three can be observed and combined to form a three phase voltage product, as shown in FIG. 4. In the later case, the three phases are fed to a dropping resistance network (DRN) 34, to reduce voltage from 480 volts to 4.8 volts, for example, and then the reduced voltages are fed to an analog-to-digital (A/D) board 36 and then to a computer 38 for display and analysis of the voltage signal. An analog multiplier may be interposed between the DRN 34 and the A/D board 36.

Figure 5:
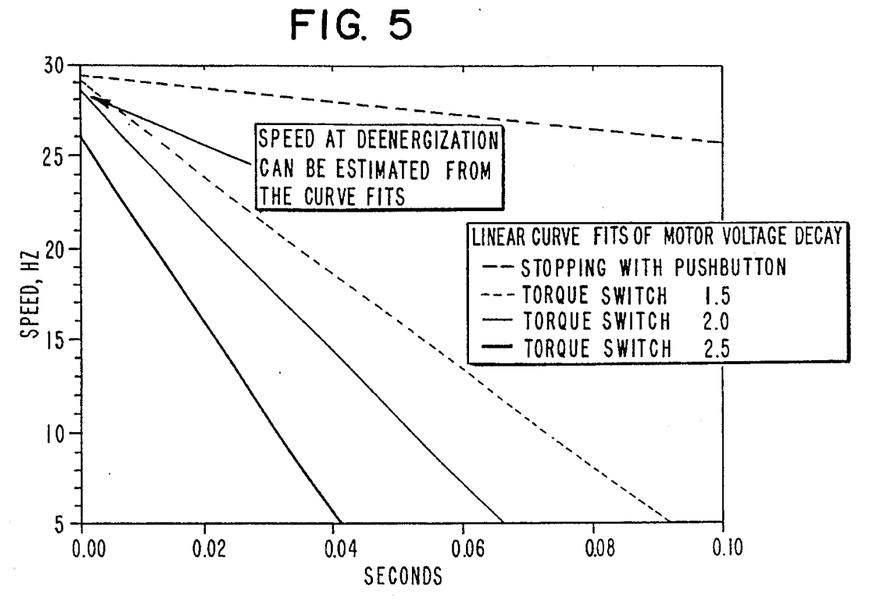
FIG. 5 is a collection of deceleration curves following motor deenergization at pushbutton stopping and different torque switch settings.

Referring to FIGS. 3(a)–3(c), by measuring the time between zero crossings of the voltage generated for each of the three torque switch conditions, a measure of rotational speed can be deduced, since the time between zero crossings is inversely proportional to speed. FIG. 5 presents speed decay curves developed from zero crossings of the voltage waveforms shown in FIGS. 3(a)–3(c). All three curves show a linear speed decay rate which varies with torque switch setting. The rate of speed decay is proportional to the decelerating torque, which as noted above, is constant for MOVs. The linear fits for the three decay curves project back to a different speed at t=0.0 seconds.

Figure 6A:
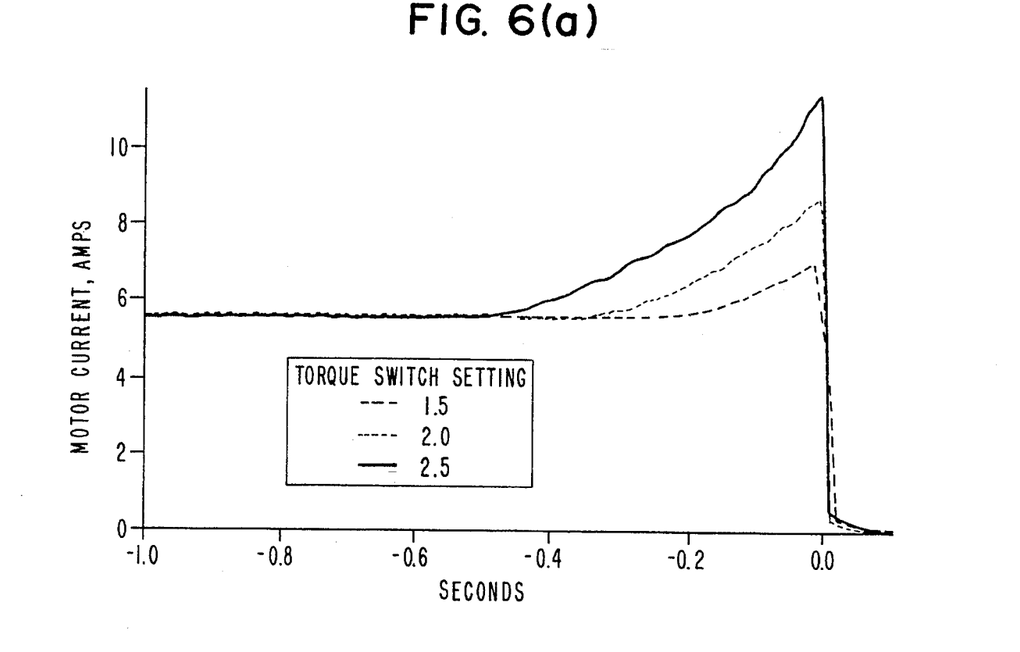
FIG. 6(a)–6(b) show motor current and power, respectively, during seating at three torque switch settings.
Figure 6B:
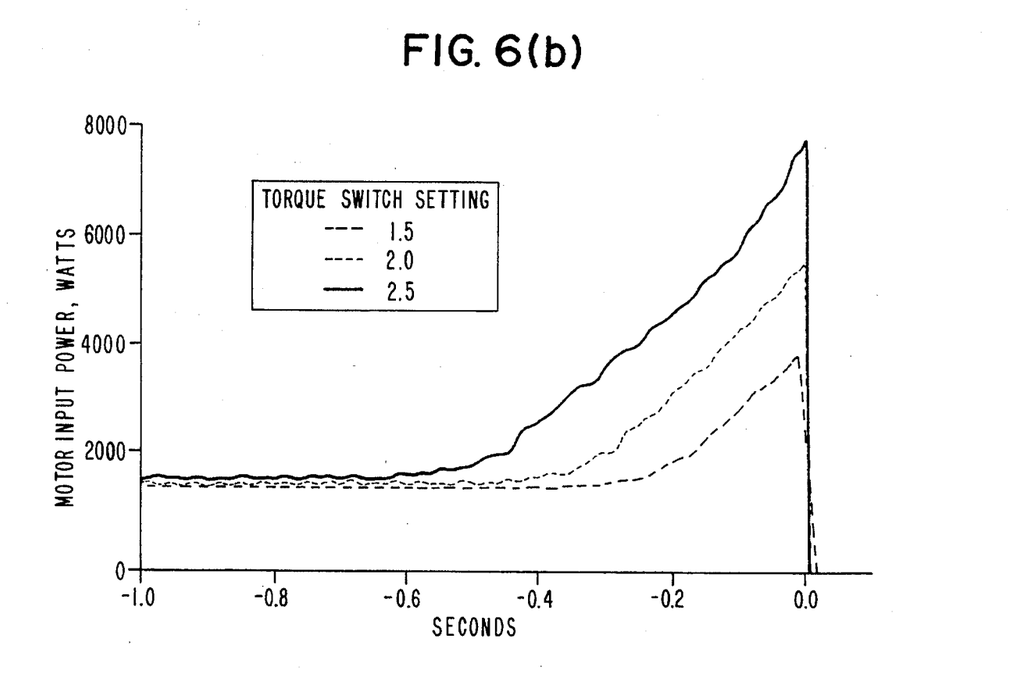

For the three torque switch settings noted above, motor current and voltage were also measured. From these parameters, motor input power and power factor were calculated by the computer 38. A plot of the rms motor current and average input power just before motor deenergization for each of the conditions is shown in FIGS. 6(a) and 6(b), respectively.

Following motor deenergization, the torque on the motor shaft decelerates the motor according to the following equation:

$$Tj = \frac{WK^2}{g} \times \frac{\alpha_2 - \alpha_2}{\Delta t}$$

where T=decelerating torque in lb-ft, $\frac{WK^2}{g}$ = the moment of inertia for the motor, and $\frac{\alpha_2 - \alpha_1}{\Delta t}$ = the change in rotational speed (in radians/sec$^2$) during the time period $\Delta t$.

Converting to more normally used terms, $$T = \frac{WK^2}{g} \times \frac{n_2 - n_2}{9.549 \times \Delta t}$$

where n=speed, in rpm. (9.549 is a conversion factor for converting radians per second to revolutions per minute.)

For the motor tested to produce the curves shown in the present drawings, the manufacturer provided Wk$^2$ as 0.33 lb-ft$^2$. Thus, the decerating torque is $$\begin{aligned}T &= \frac{0.33}{32.2} \times \frac{n_2 - n_2}{9.549 \times \Delta t} \\ &= \frac{\text{deceleration rate in rpm/sec}}{931.75} \\ &= \frac{\text{deceleration rate in Hz/sec}}{15.53}\end{aligned}$$

Since the deceleration rate is the slope of the lines in FIG. 5, the determination of the decelerating torque is then a straightforward calculation.

Figure 7:
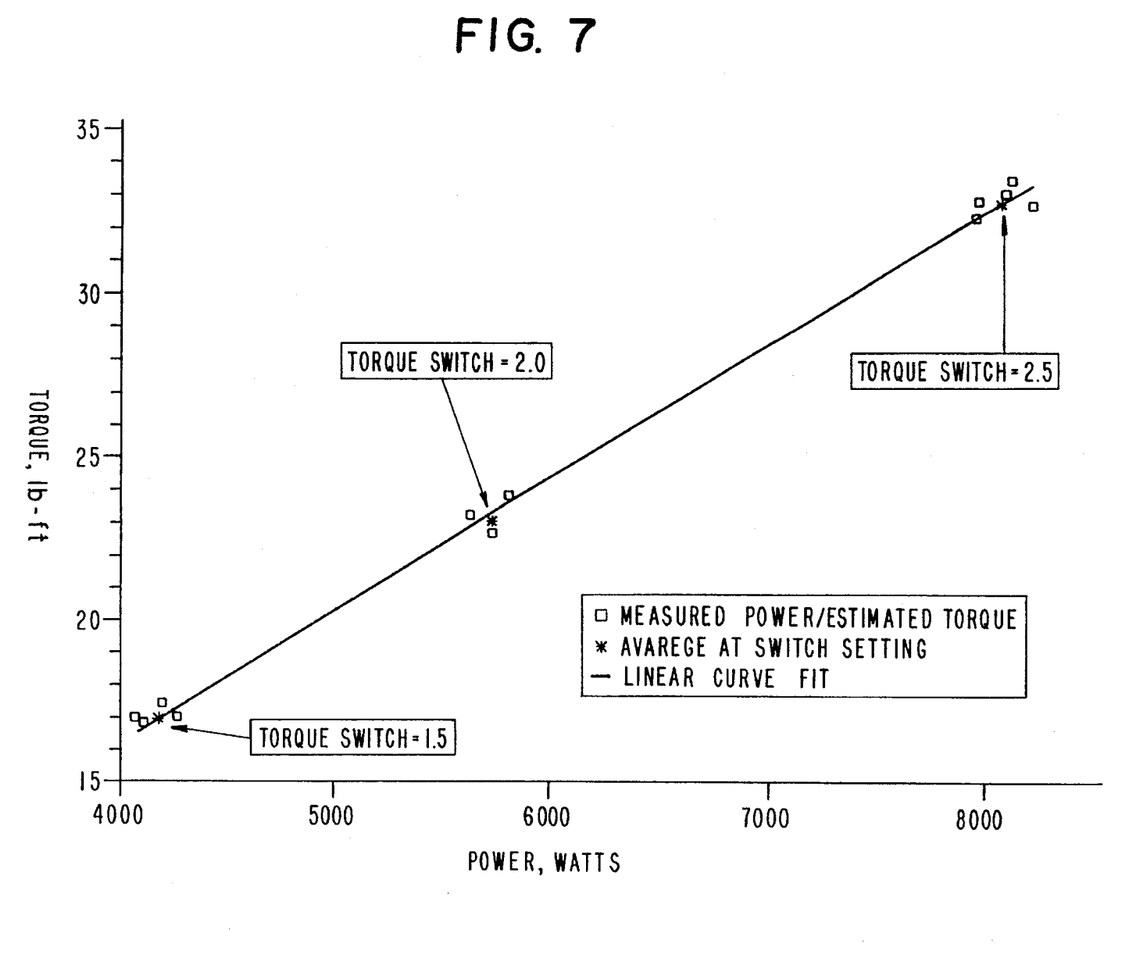
FIG. 7 is a curve showing estimated torque vs. input motor power at three torque switch settings.

A plot of the decelerating torque vs. measured seating power for five sets of data at three torque switch settings is shown in FIG. 7. Also shown is a linear curve fit of torque vs. power. As can be seen, there is excellent consistency among the measurements. It should be noted that there is actually some variation in seating characteristics from valve stroke to valve, so the scatter in the data is partially attributable to variations in the actual seating events.

FIGS. 8(a)–8(b) and 9(a)–9(b) provide plots of seating current, motor input power, torque, and power factor for the data sets represented in FIG. 7. the variability in decelerating torque is similar to the variability in power.

Motor shaft power, expressed in horsepower can be calculated from the product of the torque and speed as follows:

$$P = \frac{T \times n}{5250}$$

where

P=power in horsepower

T=torque in lb.-ft.

n=rotational speed in rpm, and 5250 is a conversion factor.

The seating speed can be estimated by projecting the deceleration line back to the point of motor shutoff. Note that in FIG. 5, the extrapolated linear curve fits for the three torque switch cases indicate different speeds at t=0.0 seconds, which is approximately the point of motor deenergization. these different speeds are consistent with the motor loads provided for the three torque switch settings.

Figure 9A:
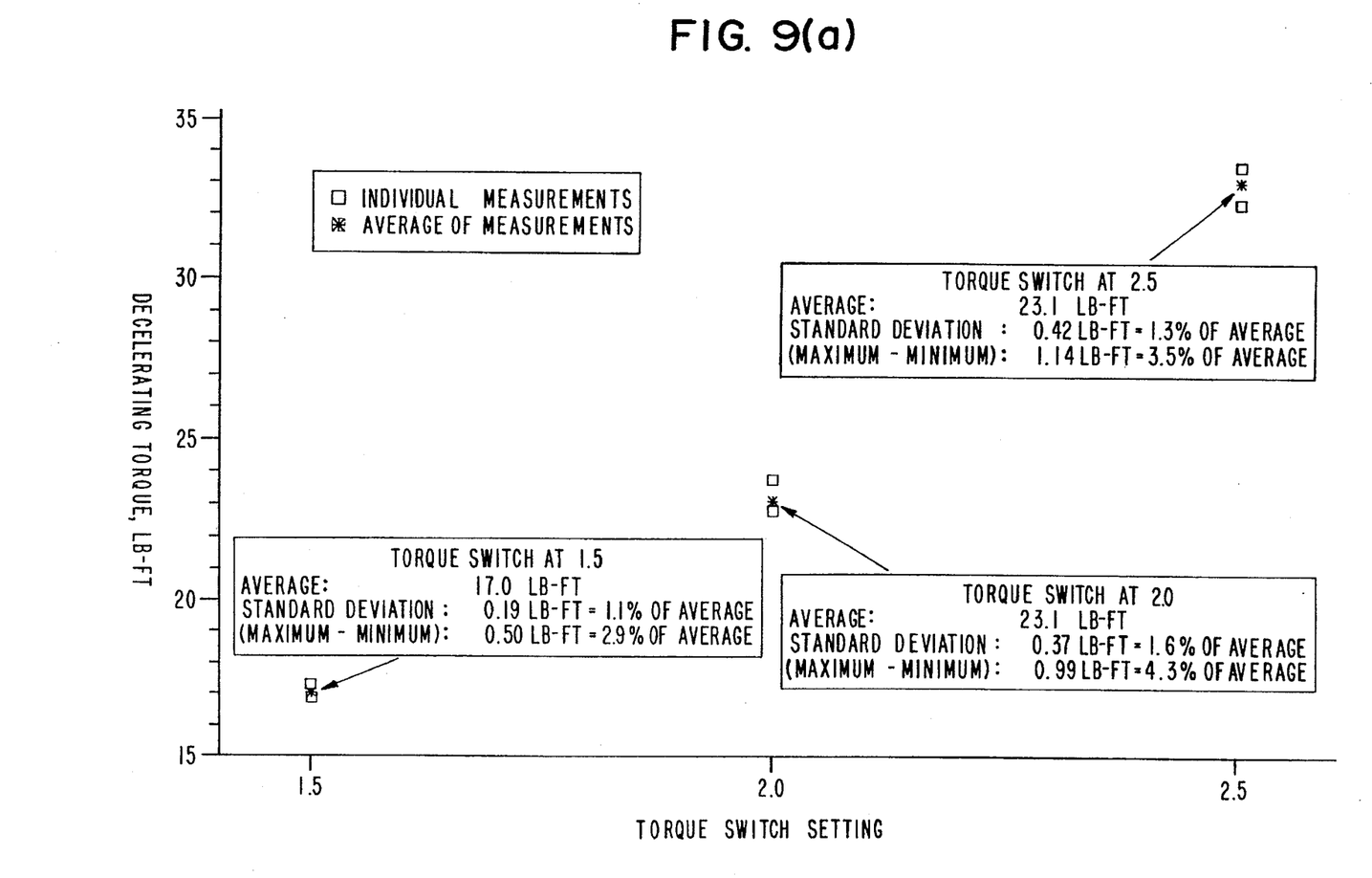
FIGS. 9(a)–9(b) are curves showing estimated torque and measured power factor for a MOV motor for three torque switch settings, with the decelerating torque calculated from a three phase voltage decay waveform.
Figure 9B:
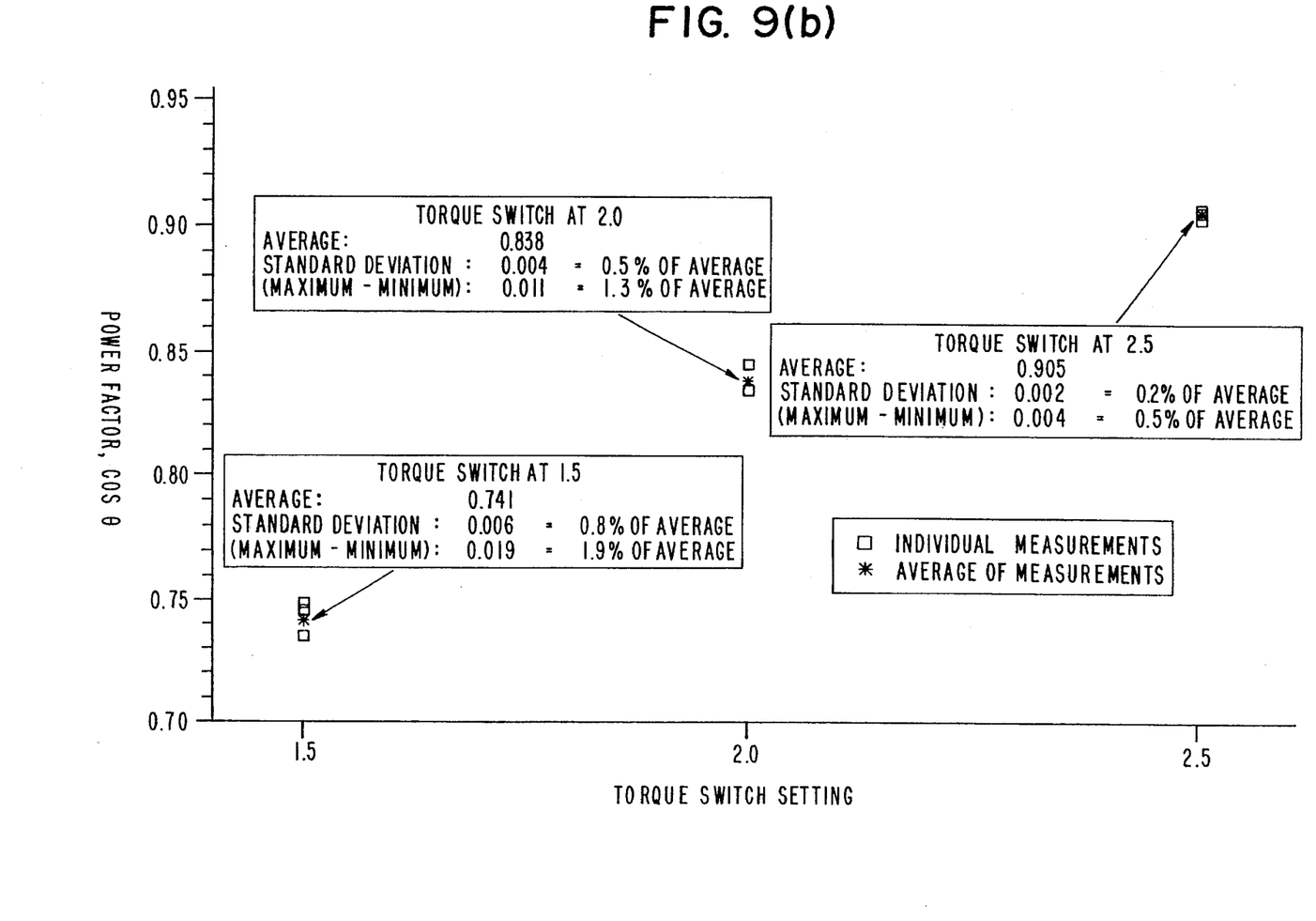

When both the torque and speed at deenergization are thus established, the motor shaft power can be estimated. If the motor input power is known (from current and voltage data), the motor efficiency can be calculated. For example, for the torque switch setting of 2.5, the average estimated rotational speed at deenergization was 1584 rpm and the average estimated torque was 32.8 lb-ft (from FIG. 9). From these values and the power equation, the seating power delivered by the motor shaft is calculated to be:

$$\frac{32.8 \times 1584}{5250}$$

9.9 hp, or 7383 watts.

Figure 8A:
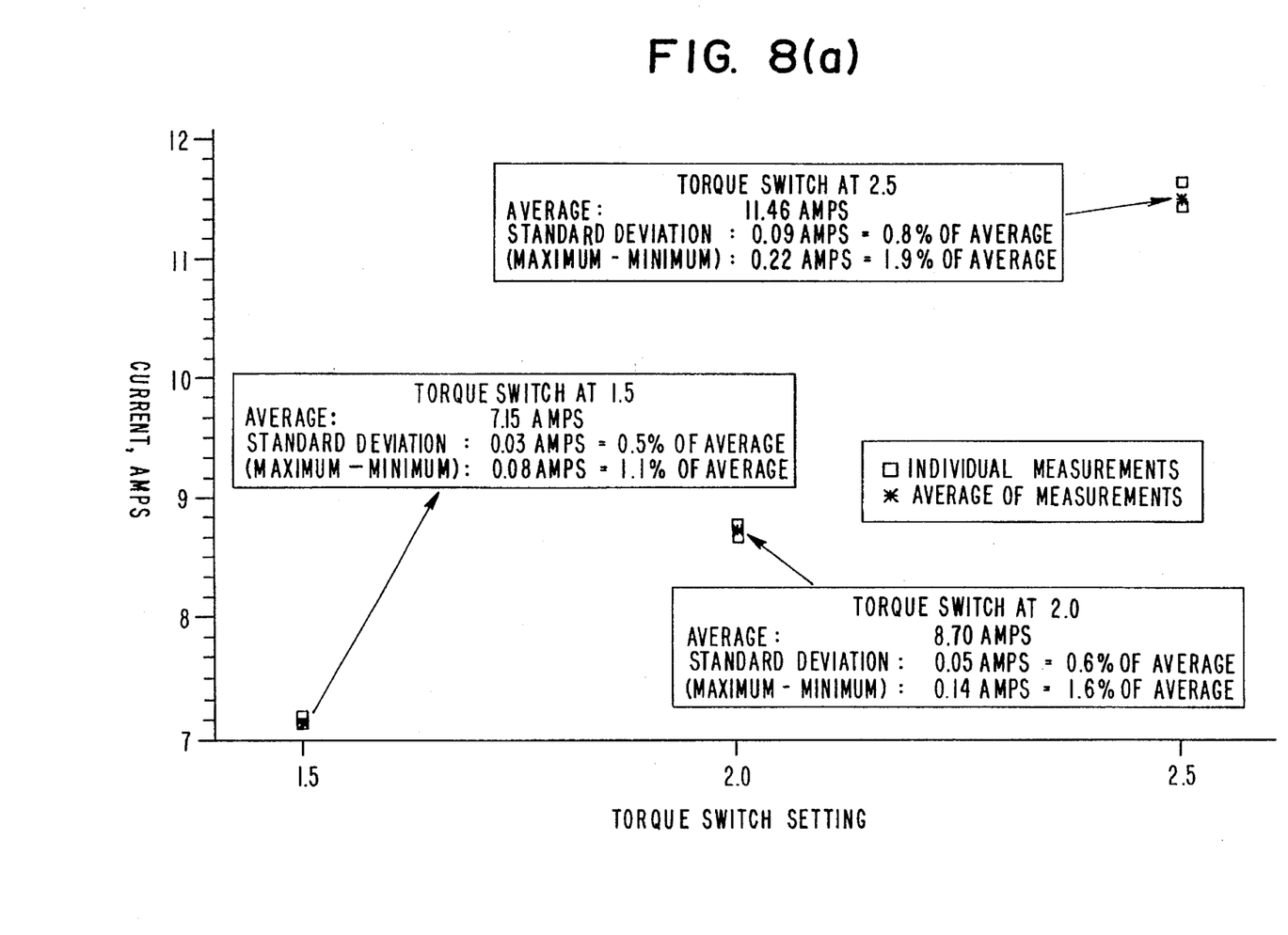
FIGS. 8(a)–8(b) show motor input seating current and power, respectively, at valve seating for three torque switch positions.
Figure 8B:
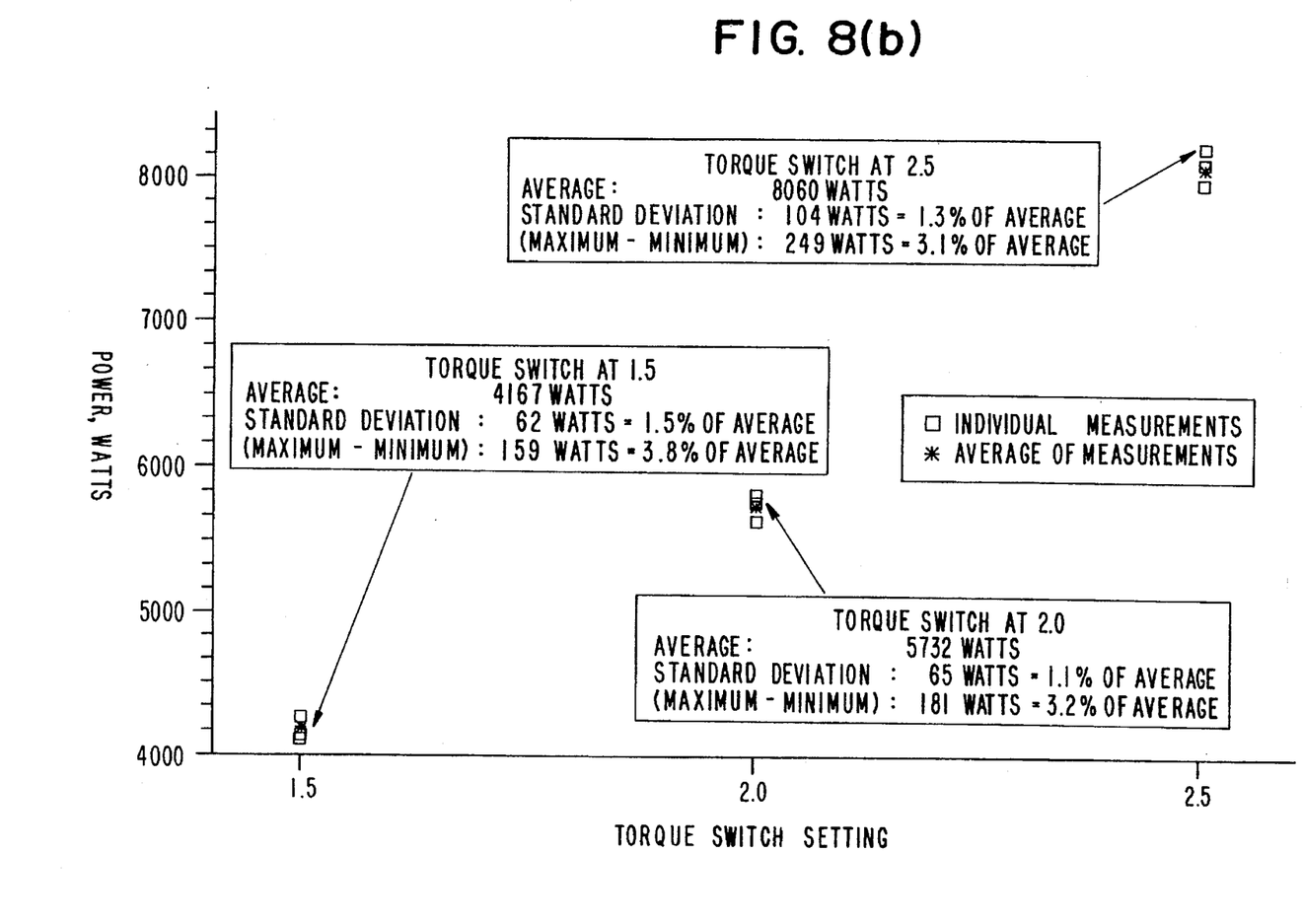

With the motor output power known, the motor efficiency can be calculated by dividing the motor output power by the input power (which can be calculated from the current and voltage waveforms). For example, from FIG. 8, the average motor input power for the torque switch setting of 2.5 was 8060 watts; thus, the estimated motor efficiency is 7383÷8060, or 0.92.

If valve stem thrust is measured (with other measurement means, not shown), the overall gear train efficiency can also be determined.

The present invention thus provides a relatively simple, non-intrusive means of determining key motor parameters, and when used in conjunction with other measurement devices, a clear picture of other drive train components.

The data described herein was taken for nominal bus voltage conditions. It is important to note that bus voltage varies from day to day, and that changes in the voltage (including variations among individual phases as well as overall voltage) can significantly affect motor parameters. However, all of the points on the typical motor performance curve—power input, power factor, current and torque—are now well established for the specific motor being tested. By varying the torque switch and re-testing, several groups of these points can be obtained. The motor specific performance curve in the as-installed condition is then established. The ability to establish this curve eliminates the conservatism required by the use of manufacturer's generic curves and ratings, which must account for manufacturing uncertainties. A much more accurate calculation of motor performance at degraded voltage conditions, using typical electrical engineering methods, is then possible, because the actual delivered torque for the specific motor and feeder is being used as a basis for the calculation.

The present invention also provides the capability to remotely measure motor output torque and power at valve seating for MOVs. This could not previously be done. The only means for deducing motor torque is by using other measured parameters (such as motor current) and comparing the parameter to the manufacturer's curves. Since the data in the manufacturer's curves may deviate considerably from actual individual MOVs, such alternative means are extremely limited, and necessitate the use of excessive conservatisms.

The present invention is also intended to be used in virtually any motor-driven device, even though the examples described herein refer to MOVs. Moreover, the motors could be dc or ac (single phase or polyphase).

While advantageous embodiments have been chosen to illustrate the invention, it will be understood by those skilled in the art that various changes and modifications can be made therein without departing from the scope of the invention as defined in the appended claims.

What is claimed is:

1. An apparatus for monitoring an electric motor coupled to a power supply line and having a deenergizing switch disposed in the power supply line, comprising:

means, coupled to a load side of the deenergizing switch, for sensing at least one electrical parameter associated with and generated by the motor; and means for correlating the at least one electrical parameter to at least one operating parameter of the motor.

2. An apparatus according to claim 1, wherein the at least one electrical parameter is voltage, and the sensing means comprises means for sensing voltage generated by the motor after deenergization.

3. An apparatus according to claim 1, wherein the motor is a three phase ac motor.

4. An apparatus according to claim 1, wherein the at least one operating parameter is motor speed, and the correlating means includes means for measuring the time between zero crossings of the voltage generated by the motor after deenergization.

5. A method of determining speed of an electric motor at deenergization, comprising the steps of:

sensing at least one electrical parameter associated with and generated by the motor at a point on a load side of a deenergizing switch;

measuring the time between zero crossings of the voltage generated by the motor after deenergization; and correlating the measured time to a motor speed at deenergization.

6. A method according to claim 5, wherein the sensing step comprises sensing voltage at a point between the motor and the deenergizing switch.

7. A method of monitoring operating parameters of an electric motor at approximately the time of deenergization comprising:

sensing at least one electrical parameter associated with the motor at a point on a load side of a deenergizing switch; and using the electrical parameter to determine at least one operating parameter of the electric motor.

* * * * *